(12) United States Patent
Sadeck

(10) Patent No.: US 9,033,374 B1
(45) Date of Patent: May 19, 2015

(54) HIGH STRENGTH FLEXIBLE CONNECTION METHOD FOR MULTIPLE LOADS

(71) Applicant: James E. Sadeck, East Freetown, MA (US)

(72) Inventor: James E. Sadeck, East Freetown, MA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 303 days.

(21) Appl. No.: 13/625,329

(22) Filed: Sep. 24, 2012

(51) Int. Cl.
  *B65H 69/04* (2006.01)
  *D04G 5/00* (2006.01)
  *F16G 11/10* (2006.01)

(52) U.S. Cl.
  CPC .............. *B65H 69/04* (2013.01); *D04G 5/00* (2013.01); *F16G 11/10* (2013.01)

(58) Field of Classification Search
  CPC ................................ B65H 69/04; F16G 11/10
  USPC ............ 289/1.2, 1.5, 18.1; 57/201; 24/115 K
  See application file for complete search history.

(56) References Cited

U.S. PATENT DOCUMENTS

| | | | | |
|---|---|---|---|---|
| 4,008,912 A * | 2/1977 | Kotov | ............................. | 289/1.2 |
| 5,573,286 A * | 11/1996 | Rogozinski | .................... | 289/1.2 |
| 5,728,109 A * | 3/1998 | Schulze et al. | ................. | 606/139 |
| 5,893,592 A * | 4/1999 | Schulze et al. | ................. | 289/1.2 |
| 5,997,051 A * | 12/1999 | Kissner et al. | ................. | 289/1.5 |
| 7,240,475 B2 * | 7/2007 | Smeets et al. | .................... | 57/201 |
| 7,404,583 B1 * | 7/2008 | Hassen | ......................... | 289/1.5 |
| 7,601,165 B2 * | 10/2009 | Stone | ............................. | 606/232 |
| 7,658,751 B2 * | 2/2010 | Stone et al. | .................... | 606/232 |
| 8,608,211 B1 * | 12/2013 | Jarvis | ............................. | 289/1.5 |
| 2007/0182157 A1 * | 8/2007 | Carrier | ............................ | 289/17 |
| 2011/0309617 A1 * | 12/2011 | Eley | ................................ | 289/1.5 |

* cited by examiner

*Primary Examiner* — Shaun R Hurley
(74) *Attorney, Agent, or Firm* — Roger C Phillips

(57) ABSTRACT

A flexible multi-load connection includes a coil of a flexible high strength cord having a loop end and two running ends, a releasable connection joining the two running ends, the releasable connection comprising a knot, and a connecting arrangement releasably joining the loop end and the two running ends.

12 Claims, 5 Drawing Sheets

HIGH STRENGTH FLEXIBLE CONNECTION METHOD FOR MULTIPLE LOADS

STATEMENT OF GOVERNMENT INTEREST

The invention described herein may be manufactured and used by or for the U.S. Government for governmental purposes without the payment of any royalties thereon or therefor.

FIELD

The aspects of the present disclosure relate generally to the field of load connection and release devices, and in particular to a load connection device for multiple loads.

BACKGROUND

There are many situations in which an object or load must be securely connected or attached to another object or load. Connecting several load bearing ropes, webbings, cords or cables at one junction is usually accomplished using a large, heavy, stiff metallic shackle or link. These stiff metallic items are typically designed to be loaded in one direction for maximum capability. When connected to multidirectional loading systems, bending within the metallic items is induced. To reduce the risk of fracture due to bending, the connections are designed to safety limits that require them to become very large and heavy.

Referring to FIGS. 1 and 2, examples of a typical stiff metal link 100 are shown. In FIG. 1, the stiff metallic link 100 is shown subject to normal loading, as indicated by arrows 102 and 104. Closure pin 106 is used for attachment of slings (not shown) connected to a load (not shown). FIG. 2 illustrates another example of a prior art stiff metal link 100 with multi-directional loading, as indicated by arrows 202-208. The loadings 202-208 may also be on different planes. This type of multi-directional loading 202-208 causes bending stress in stiff metal link 100 and closure pin 106. The bending stress can lead to damage in the stiff metal link 100 and closure pin 106, as well as lead to failure of one or both.

It would be advantageous to provide a multi-load connection junction that is constructed of high strength, flexible material, where each part of the multi-load connection between multi-loading points can be in tension without bending or damage to the connection. Items of this type would be extremely useful in the marine and para-cargo areas, for example.

Accordingly, it would be desirable to provide a multiple load connection junction that addresses at least some of the problems identified above.

BRIEF DESCRIPTION OF THE DISCLOSED EMBODIMENTS

As described herein, the exemplary embodiments overcome one or more of the above or other disadvantages known in the art.

One aspect of the exemplary embodiments relates to a flexible multi-load connection. In one embodiment, the flexible multi-load connection includes a coil of a flexible high strength cord having a loop end and two running ends, a releasable connection joining the two running ends, the releasable connection comprising a knot, and a connecting arrangement releasably joining the loop end and the two running ends.

Another aspect of the exemplary embodiments relates to a system for releasably attaching a plurality of objects together. In one embodiment, the system includes a flexible loop of a coiled cord, the coiled cord comprising a loop end, two running ends and a plurality of cord windings between the loop end and the two running ends; a connection releasably joining the two running ends; and a connecting arrangement for releasably joining the loop end and the two running ends.

A further aspect of the disclosed embodiments relates to a method of forming a high strength flexible ring for releasably attaching a plurality of objects together. In one embodiment, the method includes folding a high strength flexible cord in approximately one-half to form a loop end and two running ends, coiling the cord to form a plurality of windings of the cord, releasably securing the two running ends together and releasably securing the loop end to the secured running ends.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the present disclosure, and together with the general description given above and the detailed description given below, serve to explain the principles of the present disclosure. As shown throughout the drawings, like reference numerals designate like or corresponding parts.

DETAILED DESCRIPTION OF THE EXEMPLARY EMBODIMENTS OF THE DISCLOSURE

Figure 1:
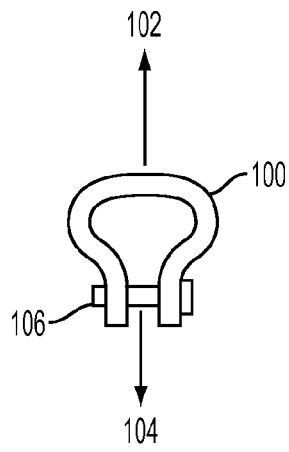
FIGS. 1 and 2 illustrate a stiff metal link of the prior art used for multi-load connections.
Figure 2:
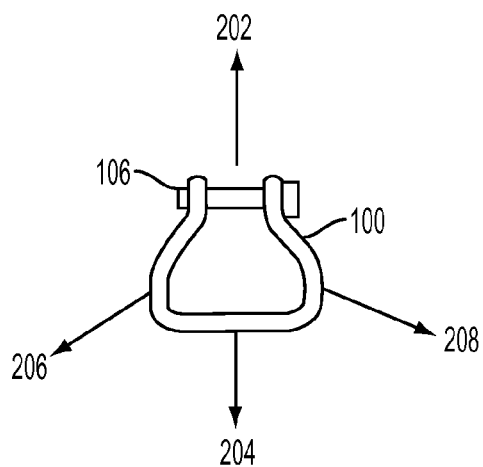
Figure 3:
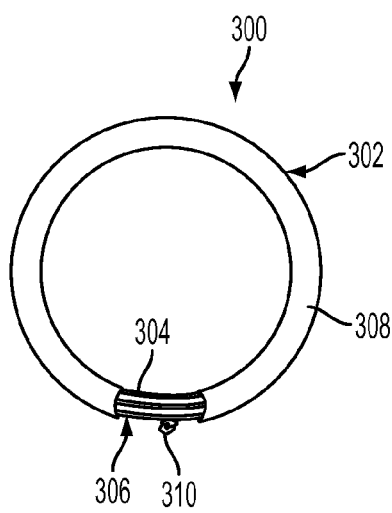
FIG. 3 illustrates one embodiment of a portion of a releasable connection incorporating aspects of the present disclosure.

Referring to FIG. 3, an exemplary multiple or multi-load connection system incorporating aspects of the present disclosure, and will be generally designated by reference numeral 300. The aspects of the disclosed embodiments are directed to a multiple load connection made of a flexible material that can be placed in tension without bending or related damage.

As shown in FIG. 3, in one embodiment, the multiple load connection 300 comprises a flexible continuous ring 302. The ring 302 is generally formed from a number of windings 306 of cord material or cord 304. The cord 304 generally comprises a high strength cord fiber or material, examples of which include polycarbonate or Aramid™, or any combination thereof. For example, in one embodiment, the cord 304 comprises a nylon fiber or cord. In an alternate embodiment, the cord 304 comprises one or more of a Kevlar™ or Spectra™ fiber material. In alternate embodiments, any suitable high strength cord can be used.

In the example of FIG. 3, the ring 300 is shown as a substantially circular member. In alternate embodiments, the ring 300 can be any suitable shape, other than including circular. The diameter of the ring 300 is generally dependent upon, and will be sized to accommodate the dimensions of the connecting members (not shown). As shown in FIG. 3, the flexible continuous ring 302 includes windings 306 of the cord 304 passing through a protective jacket 308, which in one embodiment is flexible. A connecting arrangement or connection 310 is used to coupled or connect the ends of the windings 306 together in a secure and releasable manner, as will otherwise be described herein.

Referring to FIG. 3, fabrication of the flexible continuous ring 302 comprises selection of an appropriate length and strength cord or line, generally referred to herein as cord 304. The selection of the appropriate length and strength cord 304 can depend on any one of a number of factors, and will vary depending upon the particular application, examples of which can include, but are not limited, to parachute lines and lifting straps. The weights and capacities can range from the tens of pounds to the thousands of pounds. The size of the ring 302 will vary with the particular application.

Figure 4:
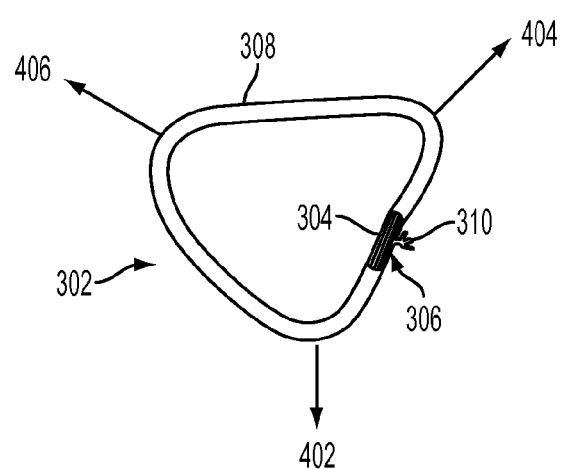
FIG. 4 illustrates a further aspect of the releasable connection illustrated in FIG. 3.

FIG. 4 illustrates the application of multiple loads in different directions 402, 404, 406 to the flexible continuous ring 302 of windings 306 of the cord 304. The application of multiple loads in different directions 402, 404, will place the flexible continuous ring 302 in tension. However, due to the flexible nature of the flexible continuous ring 302, the tension resulting from the application of each load 402-406 will not permanently bend, deform or otherwise damage the ring 302.

Figure 5:
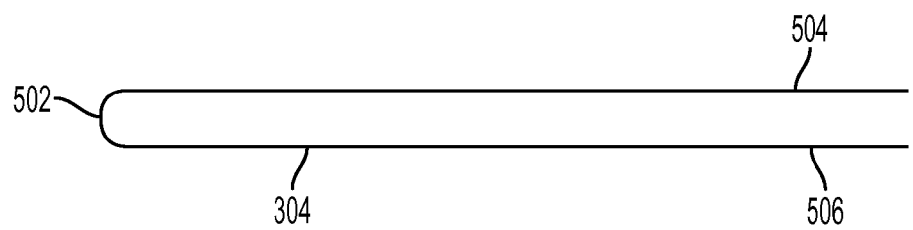
FIG. 5 illustrates one embodiment of an exemplary cord folded in half for use in conjunction with the aspects of the present disclosure.
Figure 6:
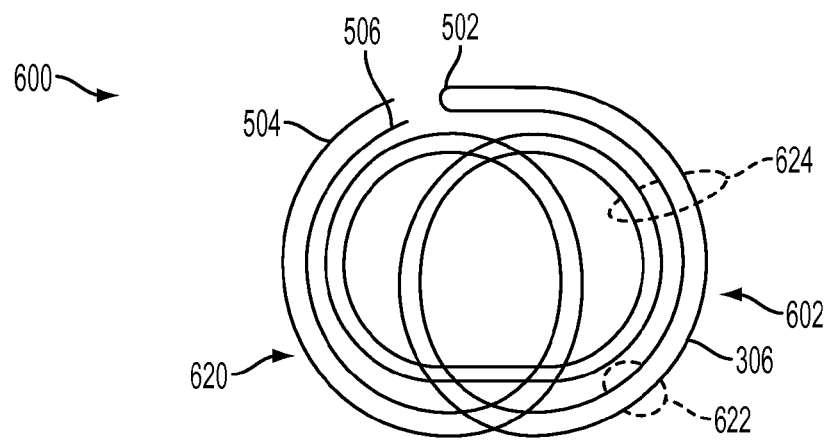
FIG. 6 illustrates the formation of a loop of coils of the exemplary cord of FIG. 5 in accordance with aspects of the present disclosure.

As is illustrated in FIG. 5, in this example, the cord 304 is folded approximately in half. This produces a loop end 502 and running ends 504, 506. When folded over, a coil 602 is formed, as is shown in FIG. 6. Each fold, or each coil 602, will result in two cord parts, shown together in FIG. 6 as 622. In the case of two coils 602, there will be four cord parts, shown as 624. In the example of FIG. 6, a number of coils are formed, generally referred to as coils 620. The coils 602 are formed into a loop 600 of coils 602, as is shown in FIG. 6. Each time the cord 304 is folded over, another coil 602 is formed. In FIG. 5, a single coil 602 is shown. FIG. 6 illustrates the formation of multiple coils 620.

As illustrated in FIG. 6 the cord 304 is formed into a loop 600 of coils 602 that are used to form the windings 306. As illustrated in FIG. 6, the cord 304 is coiled to provide a desired number of coils 602 corresponding to a pre-determined number of windings 306, also referred to as cord parts. The number of windings 306 is generally based on the needed strength for the particular job or application. For example, in one embodiment, the number of windings 306 needed is based on the load or the weight that is to be supported or lifted and the strength of the cord. An exemplary formula for determining the number of windings 306 is $(L/T_S \times C_M) \times 0.5$, where L is the desired loop strength, $T_S$ is the tensile strength of the cord 304 and $C_M$ is the material coefficient. The loop strength is a function of the number of loop parts multiplied by the desired weight to be support. For example, two coils 602 of the loop 600 results in four cord parts 624. If the desired weight to be supported is 1000 lbs, the loop strength is 4×1000=4000. The material coefficient $C_M$ is generally a pre-determined value. One common value for the material coefficient is 0.40. The loop 600 of coils 602 is then closed by connecting the loop end 502 to the running ends 504 and 506, as will be described further herein.

Figure 7:
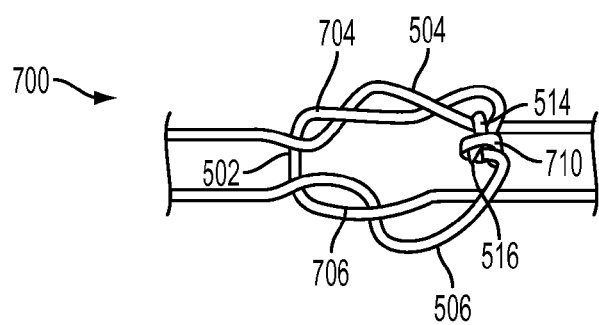
FIG. 7 illustrates one embodiment of a closure incorporating aspects of the present disclosure for connecting the ends of the cord shown in FIG. 5.

Referring to FIG. 7, one embodiment of a connecting arrangement or closure 700 for connecting the running ends 504, 506 to the loop end 502 is illustrated. In this example, the running ends 504, 506 are interlaced or interwoven with respective portions 704, 706 of the loop end 502. The end portions 514, 516 of the running ends 504, 506 are then securely coupled or connected together. In one embodiment, the end portions 514, 516 are connected together using a water knot 710, as such is generally known and understood. In alternate embodiments, the end portions 514, 516 can be connected together in any suitable manner using any suitable knot or mechanical connector. The aspects of the disclosed embodiments allow the loop end 502 to be secured to, and easily released from, the running ends 504, 506.

Figure 8:
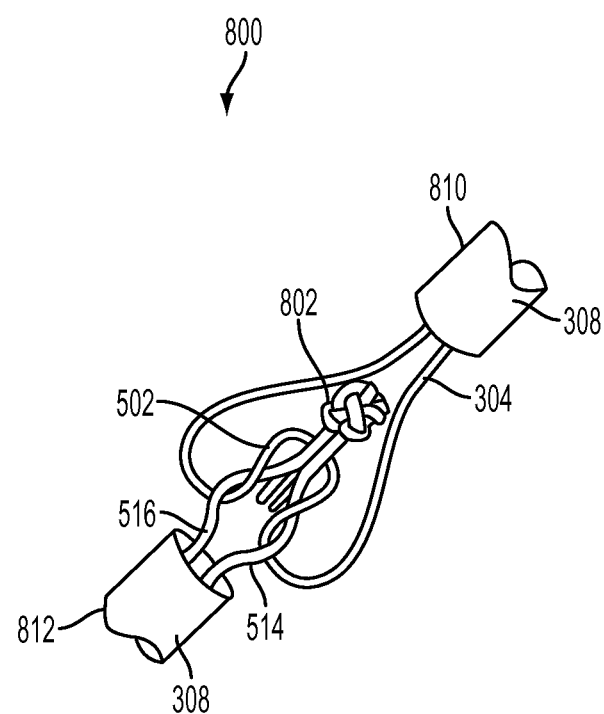
FIG. 8 illustrates one embodiment of a closure incorporating aspects of the present disclosure for connecting the ends of the cord shown in FIG. 5.

Referring to FIG. 8, another embodiment of a closure 800 incorporating aspects of the present disclosure is illustrated. In this embodiment, the loop end 502 from end 810 of the protective ring 308 can be readily connected to and released from the running ends 504, 506 from end 812 of protective ring 308. As shown in FIG. 8, the running ends 504, 506 are coupled together with a knot 802, which in this embodiment comprises a "Parachute Riggers Rip Cord Knot", as is generally known in the art. In this example, the loop end 502 is brought through and between the running ends 504, 506 just below the knot 802. The loop end 502 is then inserted into the opening 804 and brought up and over the knot 802. The loop end 502 is tightened or cinches around the knot 802 as is shown in FIG. 8.

Figure 9:
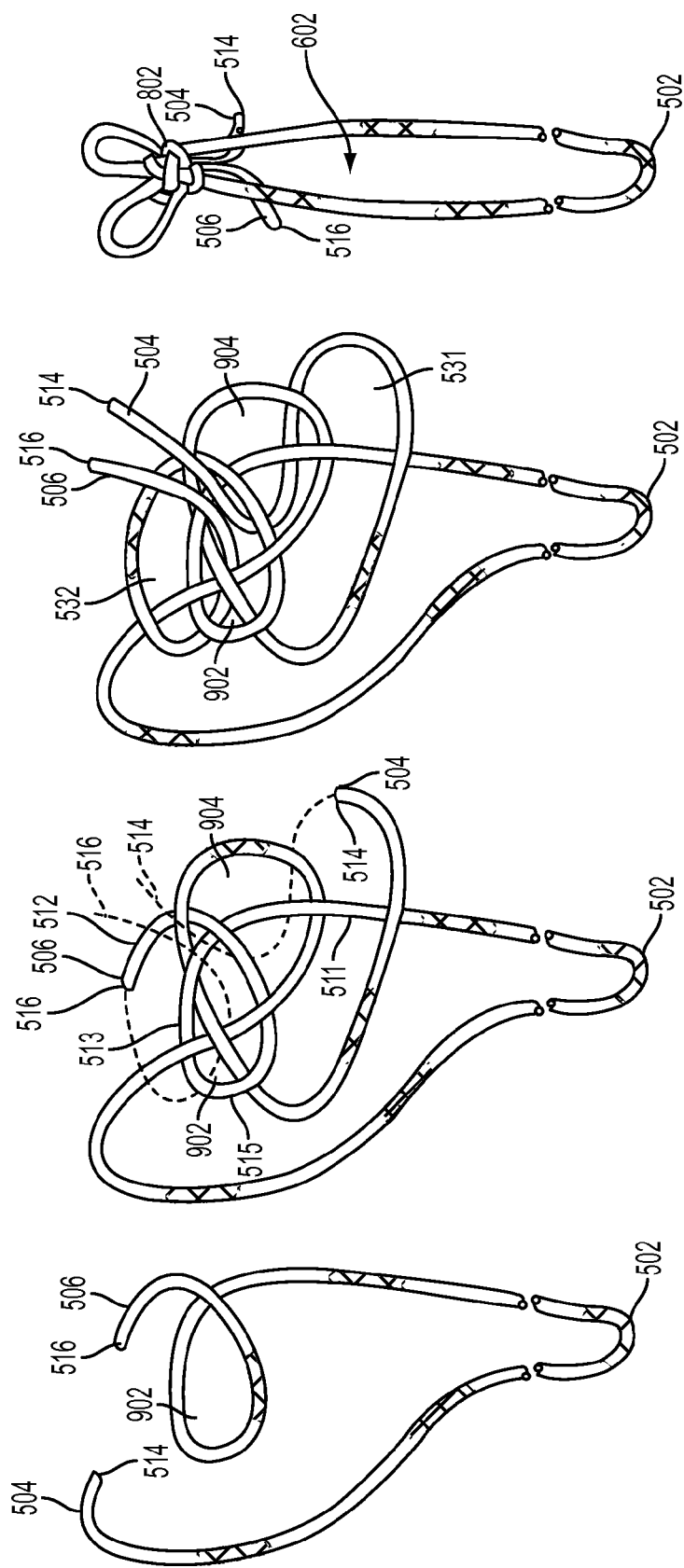
FIGS. 9A-9D illustrates one embodiment of the formation of the closure illustrated in FIG. 8.

FIGS. 9A-9D illustrates one embodiment of a process for tying the Parachute Riggers Rip Cord Knot shown in FIG. 8. In this example, referring to FIG. 9A, a loop 902 is formed on the running end 506 of the cord 304. As shown in FIG. 9B, the end 514 of the running end 504 is passed over the top of the loop 902, under a portion 511 of cord 500, over portion 512, under portion 513 and crossing itself to form loop 904, under portion 515, and back over portion 511. As is shown in FIGS. 9B and 9C, the ends 514, 516 are passed under and through both loops 902, 904. The ends 514, 516 are then fed over and through the outside loops 531, 532 as shown in FIGS. 9C and 9D. The ends 514, 516 are pulled tight, leaving approximately one inch of running ends 504, 506. The loop end 502 is then brought through and between running ends 504, 506 as is shown in FIG. 8. Loop end 502 is brought up and over knot 802, cinching around knot 802 as shown. This closes the loop which will for the coil 602 connects loop end 502 to running ends 504, 506. Releasing is a reverse of this process.

Figure 10:
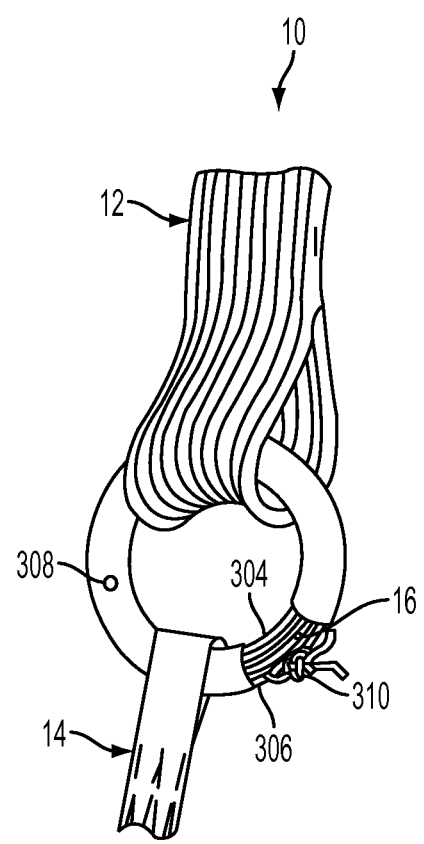
FIG. 10 illustrates one embodiment of a parachute line connection incorporating aspects of the present disclosure.

FIG. 10 illustrates one embodiment of a connection 10 incorporating aspects of the present disclosure used to attach parachute suspension lines 12 to a parachute riser 14. In is example, the flexible coil connection 16 has windings 306 passing through a flexible protective ring 308 shown in FIG. 3. The protective ring 308 is configured to prevent any chafing or wear between the suspension line 12, riser 14 and flexible coil connection 16. The windings 306 of the cord 304 are securely joined together by releasable connection 310.

The aspects of the disclosed embodiments advantageously provide a high strength flexible connection for coupling multiple loads together. The flexible connection of the disclosed embodiments can be formed without the need for stitching and splicing, and the connection can be created anywhere.

Thus, while there have been shown, described and pointed out, fundamental novel features of the invention as applied to the exemplary embodiments thereof, it will be understood that various omissions and substitutions and changes in the form and details of devices and methods illustrated, and in their operation, may be made by those skilled in the art without departing from the spirit of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A flexible multi-load connection, comprising:
    a coil of a flexible high strength cord having a loop end and two running ends;
    a releasable connection joining the two running ends, the releasable connection comprising a knot;
    a connecting arrangement releasably joining the loop end and the two running ends;
    wherein the coil is closed by the connecting arrangement; and
    wherein the connecting arrangement comprises intertwining the loop end with the running ends prior to formation of the knot.

2. The flexible multi-load connection of claim 1, comprising:
    a plurality of windings formed by the coil of flexible high strength cord; and
    a flexible protective jacket encasing the plurality of windings.

3. The flexible multi-load connection of claim 1, wherein the coil comprises a plurality of windings of the cord.

4. The flexible multi-load connection of claim 1, wherein the knot comprises a water knot or a parachute riggers rip cord knot.

5. A flexible multi-load connection, comprising:
    a coil of a flexible high strength cord having a loop end and two running ends;
    a releasable connection joining the two running ends, the releasable connection comprising a knot;
    a connecting arrangement releasably joining the loop end and the two running ends;
    wherein the coil is closed by the connecting arrangement; and
    wherein the connecting arrangement comprises a cinch connection releasably coupling the loop end to the running ends.

6. The flexible multi-load connection of claim 1, wherein the coil is flexible along multiple axis simultaneously.

7. The flexible multi-load connection of claim 1, wherein the coil is flexible along multiple planes simultaneously.

8. A method of forming a high strength flexible ring for releasably attaching a plurality of objects together, the method comprising:
    folding a high strength flexible cord in approximately one-half to form a loop end and two running ends;
    coiling the cord to form a plurality of windings of the cord;
    releasably securing the two running ends together; and
    releasable securing the loop end to the secured running ends.

9. The method of claim 8, comprising releasably securing the two running ends together with a knot.

10. The method of claim 9, wherein the knot comprises a water knot or a parachute riggers knot.

11. The method of claim 9, comprising releasable intertwining the knot with the loop end to secure the running ends to the loop end.

12. The method of claim 9, comprising bringing the loop end between the two running ends and over the knot to releasable secure the loop end to the two running ends.

* * * * *